Dec. 10, 1929. W. E. TRUMPLER 1,739,106
BALANCING MACHINE
Filed June 16, 1928    3 Sheets-Sheet 1
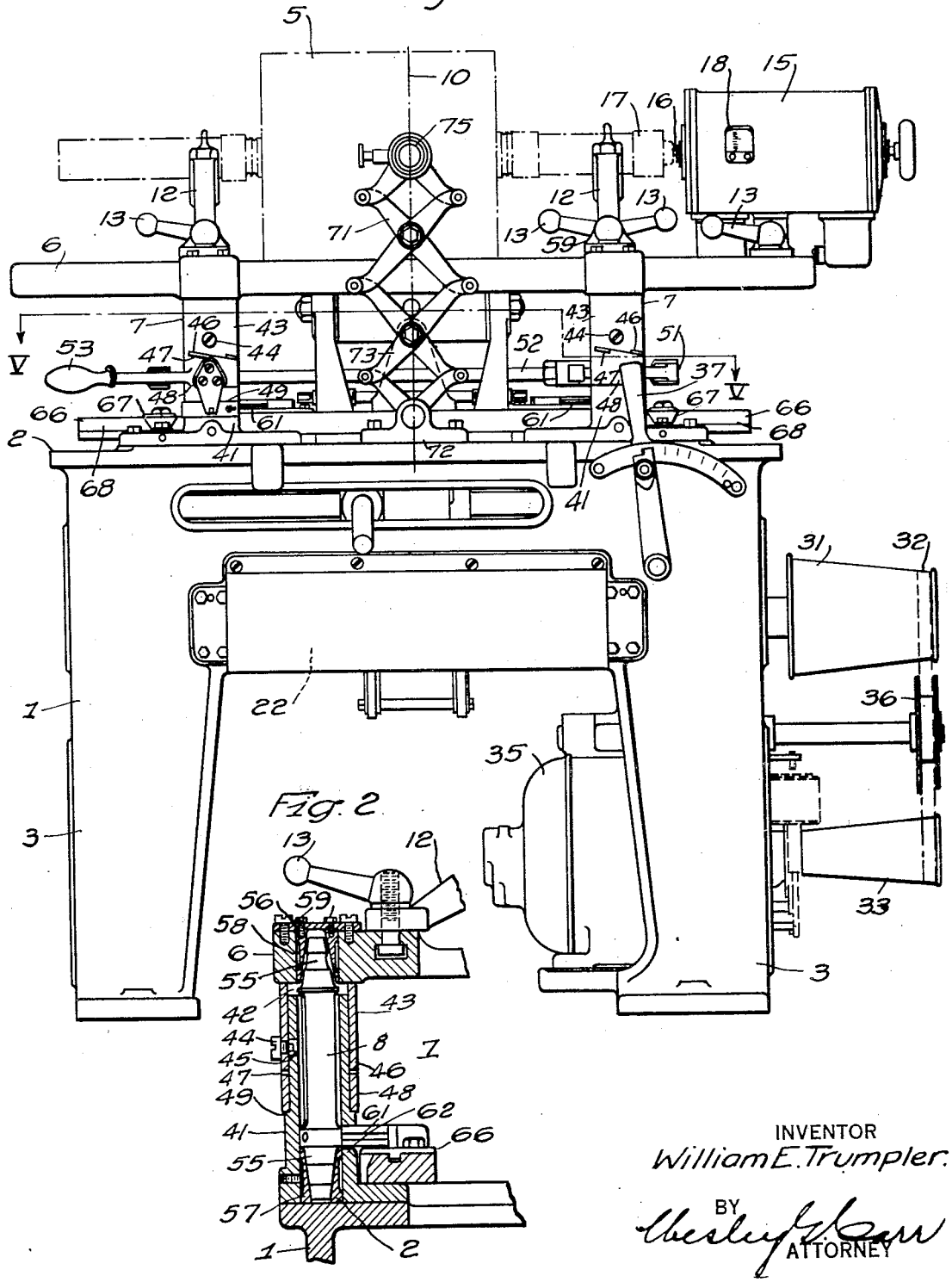
INVENTOR
William E. Trumpler.
BY
Chesley G. Carr
ATTORNEY Dec. 10, 1929.  W. E. TRUMPLER  1,739,106
BALANCING MACHINE
Filed June 16, 1928    3 Sheets-Sheet 2

INVENTOR
William E. Trumpler.
BY
ATTORNEY

Dec. 10, 1929.  W. E. TRUMPLER  1,739,106
BALANCING MACHINE
Filed June 16, 1928  3 Sheets-Sheet 3

INVENTOR
William E. Trumpler.
BY
Wesley G. Carr
ATTORNEY

Patented Dec. 10, 1929

1,739,106

UNITED STATES PATENT OFFICE

WILLIAM E. TRUMPLER, OF EASTON, PENNSYLVANIA, ASSIGNOR TO WESTINGHOUSE ELECTRIC & MANUFACTURING COMPANY, A CORPORATION OF PENNSYLVANIA

BALANCING MACHINE

Application filed June 16, 1928. Serial No. 285,949.

The invention relates, in general, to machines for balancing rotatable bodies and, in particular, to spring systems for balancing machines.

The present invention is an improvement upon the subject matter of my co-pending application, Serial No. 53,116, filed August 28, 1925, in which I have disclosed a balancing machine that comprises a base and an oscillatable bed member that is mounted on the base by means of vertically disposed leaf springs.

It is an object of the invention to provide a balancing machine that utilizes vertically disposed leaf spring members which are connected by a mechanism for simultaneously adjusting them for the purpose of moving the axis of oscillation.

Another object of the invention is to provide a balancing machine that is of simple and sturdy construction and that may be utilized to determine accurately the state of balance of a rotatable body.

A further object of the invention is to provide a balancing machine that is readily adjustable to adapt it for balancing rotors of various sizes and degrees of unbalance and to accomplish the balancing operation to any required degree of fineness.

Upon studying the following description of the invention, it will become apparent that these and other objects may be attained by means of the apparatus shown in the accompanying drawing, in which:

Figure 1 is a view, in side elevation, of a balancing machine embodying the principles of the invention;

Fig. 2 is a fragmentary view of one of the spring units of the balancing machine taken in section along the line II—II of Fig. 4;

Figure 3:
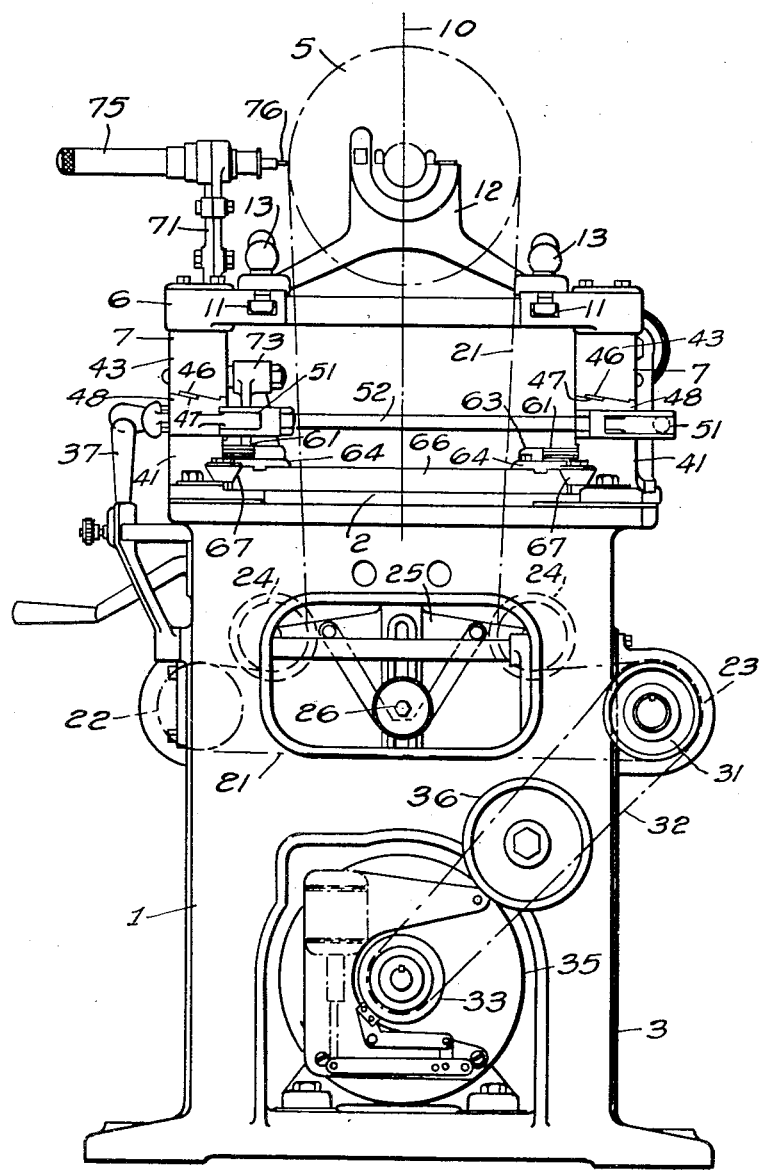
Fig. 3 is a view, in end elevation, of the balancing machine shown in Fig. 1, the balancing head being removed.

Referring first to Fig. 1 of the drawing, the balancing machine comprises, in general, a base member 1 that is of substantially rectangular shape and includes a horizontal top portion 2 supported by means of a plurality of legs or pedestal members 3, in the manner usually employed in constructing machine bases.

For the purpose of supporting a rotor 5 to be tested, the balancing machine is provided with an oscillatable bed member 6 that is disposed longitudinally of, and above, the upper surface of the top portion 2 of the base 1, and supported on the base by means of four spring units 7.

The spring units 7 are disposed symmetrically with respect to the base member 1 and, in the present instance, they are located at the corners of a rectangle which is somewhat smaller than the rectangle defining the top portion 2 of the bed member 1. Each of the spring units comprises a vertically disposed leaf spring 8 which normally serves to carry the weight of the bed member and is disposed to be turned about a vertical axis in order that the plane 9 in which it lies may be brought to intersect with the planes of the other three spring members at a common vertical line 10 that constitutes the axis of oscillation of the bed member 6.

The oscillating bed member 6 has provided, in its upper surface, parallel longitudinally disposed T-slots 11 for the purpose of receiving a pair of bearing brackets 12 for supporting the rotor 5 to be tested. In order to retain the brackets in predetermined positions in the T-slots, clamping bolts 13, which may be readily loosened in order to slide the brackets 12 along the T-slots 11, are provided.

At the extreme right of the bed member 6, as seen in Fig. 1, a balancing head 15 may be mounted in the T-slots 11 and retained in any position by means of the clamping bolts 13, in a manner similar to the method of fastening provided for the bearing pedestals 12. As fully described in Patent No. 1,709,694, issued April 16, 1929, and assigned to the Westinghouse Electric and Manufacturing Company, the balancing head 15 is provided with movable weights which are mounted on a shaft 16 that may be connected to the rotor 5 by means of a coupling 17. Control means are provided for shifting the weights within the balancing head 15 in such manner that an artificial unbalanced condition may be set up and adjusted to neutralize any unbalance existing in the rotor 5. The position of the artificial unbalance may be determined by means of a scale 18.

The rotor 5, together with the balancing head 15, may be rotated by means of a belt 21 that passes over the top of the rotor 5 and extends vertically downward through openings in the oscillatable bed 6 and the top portion 2 of the base member 1.

An idler roller 22 is provided at the forward side of the base member 1 for receiving the belt 21, and a driving roller 23 is journalled to rotate about an axis extending parallel to the axis of idler roller 22 and at the back of the base member 1. Guide pulleys 24 are mounted on the base 1 for guiding the belt 21 in such manner that the runs between the idler roller 22 and the driving roller 23 extend in substantially horizontal planes.

The guide pulleys 24 are connected to the frame 1 by means of a linkage 25. In order that the belt 21 may not exert horizontal force upon the rotor 5, the linkage 25 is so designed that, when a belt of a predetermined length is utilized, the runs of the belt that extend between the rotor 5 and the idler pulleys 24 will be substantially vertical, regardless of the diameter of the particular rotor 5 that may be disposed in the balancing machine. To insure the proper tension in the belt 21, a weight 26 is connected to the idler pulleys 24 in such manner as to bias them against the belt 21.

To provide means for varying the speed of rotation of the rotor 5, the driving drum 23 is provided with a cone pulley 31 that is connected, by means of a second belt 32, to a complementary cone pulley 33 that is disposed on the shaft of a driving motor 35. The regulation of the speed of the rotor 5 is accomplished by means of a belt guide 36 that is connected to an operating lever 37 in such manner that, by actuating the lever 37, the belt 32 may be moved to any desired position along the faces of the cone pulleys 31 and 33.

It will be readily understood that, because the spring units 7 are disposed to occupy space other than that directly beneath the rotor 5, it is possible to drive the rotor by means of a vertically disposed belt which does not, in any way, interfere with the balancing operation. Further, this drive mechanism does away with the necessity of mounting the driving motor on the bed 6, and, therefore, permits greater sensitiveness of the balancing machine for the reason that the proportion of the total mass of the vibrating system to the mass of the rotor being tested is small.

In order to protect the vertical leaf springs 8 that are contained within the spring units 7 when the rotor 5 is placed upon, or removed from, the pedestals 12, each of the spring units 7 is provided with means for lifting the bed member 6 and for supporting it. As shown in detail in Fig. 2, each of the spring units 7 comprises a cylindrical pedestal or guide 41 that is mounted vertically on the base 1 in such manner that it is disposed to enclose and protect the spring 8 throughout the greater portion of its length.

The pedestal 41 does not interfere with movement of the bed member 6 because a clearance space 42 is provided between its upper end and the bottom of the bed 6. For the purpose of lifting the bed 6, a cylindrical sleeve member 43 is disposed about the pedestal 41 in such manner that it is free to move vertically with respect thereto but is prevented from turning thereon by means of a screw 44 which is threaded in the sleeve 43 and extends into a vertical slot 45 in the pedestal 41.

The lower portion of the sleeve 43 is provided with notches 46 having sloping faces that are disposed to receive similarly shaped projections formed by cutting notches 47 in the upper surface of a collar 48 which is disposed around the lower portion of the pedestal 41 and bears upon a shoulder or step bearing 49 that may be formed integrally with the pedestal.

Referring to Fig. 1, it will be readily seen that, by reason of the sloping faces of the cooperating notches 46 and 47, when the collar 48 is turned upon the pedestal 41 the sleeve member 43 will be caused to move up or down in a manner similar to the action of a screw jack. The sleeve 43 and the collar 48 are so proportioned that, when the collar is turned, to its full extent, in one direction, the sleeve 43 will become disengaged from the lower side of the bed member 6, and, when the collar 48 is moved from this position to its upper most position, the sleeve 43 will be moved upwardly and will lift the bed member 6.

Figure 4:
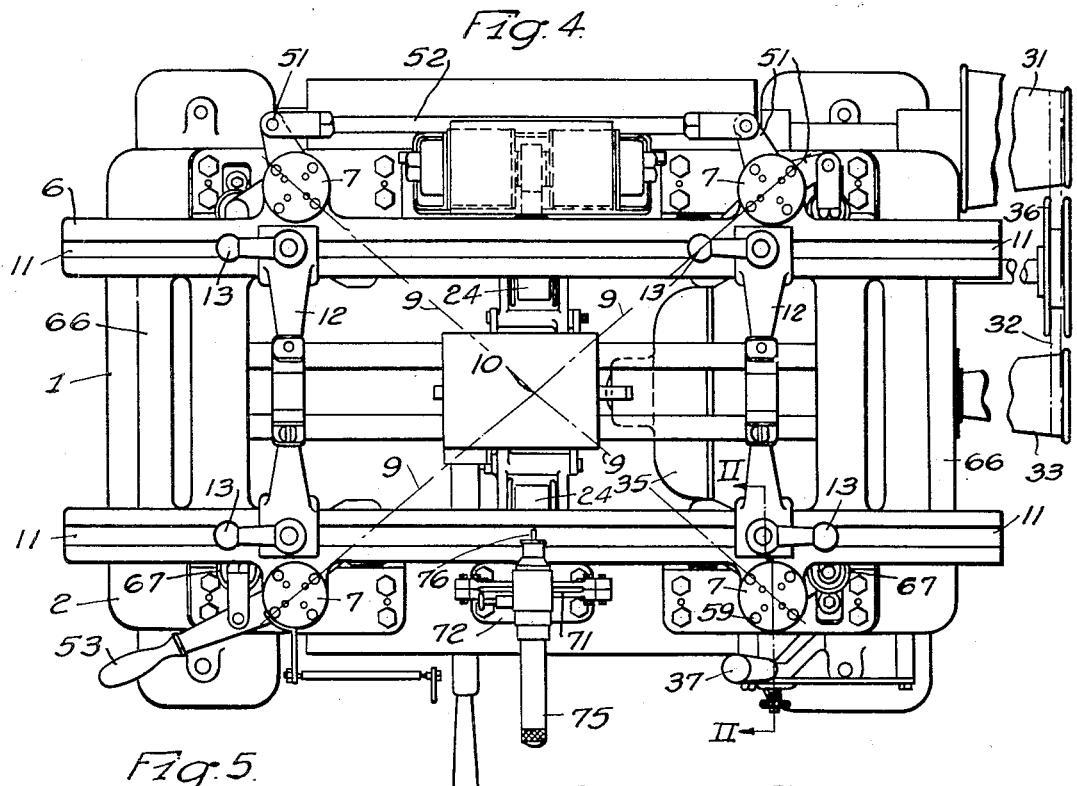
Fig. 4 is a plan view of the balancing machine shown in Figs. 1 and 3.
Figure 5:
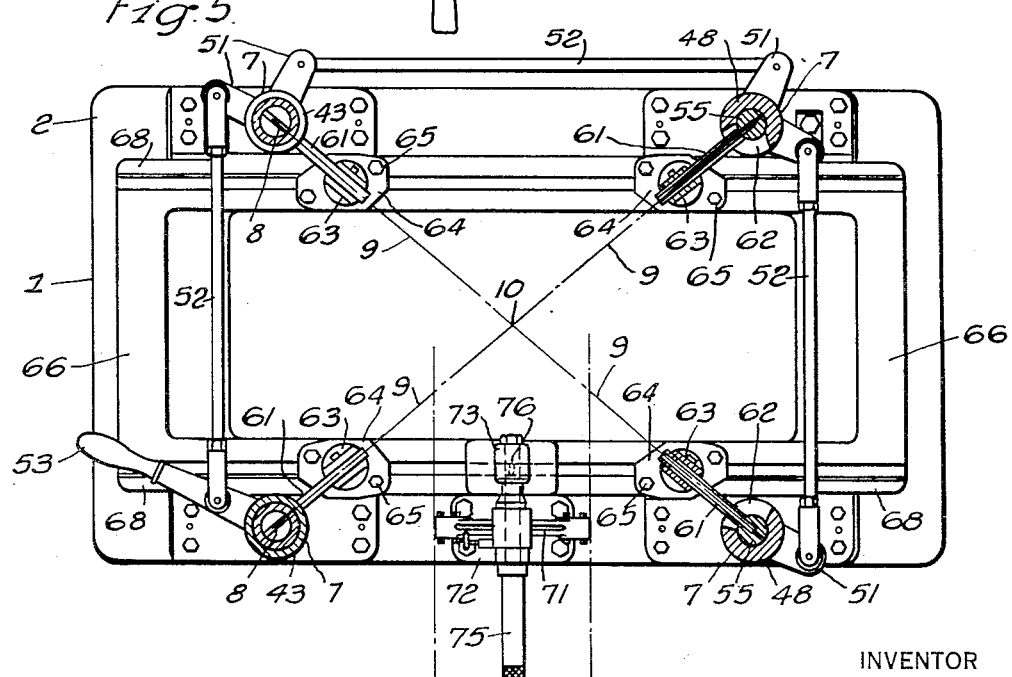
Fig. 5 is a view, in horizontal section, of the spring system of the balancing machine, taken along the line V—V of Fig. 1.

The collars 48 are provided with lever arms 51 which are connected, by means of rods 52, in such manner that all of the collars 48 are constrained to turn simultaneously. To provide means for actuating collars 48, the lever arm on the collar at the left front of the machine, as shown in Figs. 1, 4 and 5, is provided with a hand lever 53. By moving the hand lever 53 forward as shown in Fig. 4, the operator may cause each of the sleeves 43 to be moved upwardly, thereby lifting the entire bed member 6 from the springs 8 and supporting it substantially rigidly by the four pedestals 41 and the sleeves 43. When the bed 6 is thus lifted from the spring 8, a rotor 5 may be placed in position upon the pedestals 12 without danger of overstressing and bending the spring elements 8.

Further, when it is found desirable to turn the springs 8 in order to change the position of the axis of oscillation 10, it is advisable to so lift the bed 6 in order that there may be no torsional friction forces exerted upon the springs 8. It is obviously desirable that the spring members 8 be so interconnected, at all times, that their planes 9 will intersect in some given axis 10, and further that they be arranged in such manner that all four springs may be rotated simultaneously the correct amount to effect a change in the position of the oscillation axis 10.

As shown in Fig. 2, the spring members 8 are each provided with conical ends 55 that are disposed within cups 56 and 57 at the top and the bottom of the spring 8, respectively. The cup 56 is disposed within an opening 58 in the bed member 6 and is secured to the bed member by means of cap screws 59. The cup 57 is disposed within the lower portion of the pedestal 41 and rests upon the upper surface 2 of the bed member 1.

It will be readily seen that, when the bed member 6 is raised by means of the sleeve 43, the conical ends 55 of the spring 8 will become loosened in the cups 56 and 57, thereby permitting the spring 8 to be rotated about its longitudinal axis.

In order to accomplish the simultaneous motion of the four spring members 8, each spring is provided, at its lower end, with a telescoping lever 61 that projects through an opening 62 in the pedestal 41. The extending ends of the levers 61 are slidingly engaged by swivel blocks 63 that are rotatably mounted in brackets 64 which are secured, by means of bolts 65, to a sliding grid member 66. The grid member 66 is substantially rectangular in shape and is disposed upon the upper surface 2 of the base 1 in such manner that it is free to slide longitudinally with respect thereto.

In order to maintain the grid 66 in its proper position and to permit it to slide readily, the base member 1 is provided with four conical rollers 67 that are disposed to engage chamfered portions 68 of the sides of the grid member 66 near each corner thereof. The brackets 64 are so disposed upon the grid 66, and the length of the telescoping arms 61 so selected that the planes 9, including the arms 61 and the springs 8, will intersect at a given vertical line 10 at some position along the longitudinal center line of the balancing machine for any given position of the grid 66 relative to the base 1.

In order that the position of the oscillation axis 10 may be readily ascertained and means provided for easily and quickly adjusting this position, the balancing machine is provided with lazy-tongs mechanism 71, that is pivoted, at its lower end, in a bracket member 72 which is secured upon the base member 1. The second pair of levers in the lazy-tongs 71 are pivoted at their center portions on a bracket 73 that is mounted on the grid member 66 at its transverse center. It will be readily seen that, when the grid member 66 is moved horizontally, the bracket 73 and the center portion of the links to which it is pivoted will move along a horizontal line and that, therefore, the upper end of the lazy-tongs mechanism 71 will also describe a horizontal line.

The lazy-tongs mechanism 71 with the grid member 66 and the means for turning the springs 8 are so designed for correlated movements that the upper end of the lazy-tongs 71 will, at all times, occupy the transverse plane which includes the oscillation axis 10. To facilitate the adjusting of the oscillation axis 10, the upper end of the lazy-tongs mechanism 71 is provided with an actuating handle 75, the handle 75 being further provided with a pointer 76 which may, for convenience, be constructed as a center punch for marking the rotor 5.

In operation, the member 6 is first lifted from the springs 8 by moving the lever 53 forward to the position shown in Fig. 4 as hereinbefore described. The belt 21 may then be placed around a rotor 5 to be tested, the rotor placed in the journals 12, and the balancing head 15 connected to the rotor shaft by means of the coupling 17. The handle 75 may then be moved to bring the pointer 76 into one balancing plane of the rotor 5. The bed member 6 is then lowered, in order to bring it into engagement with the springs 8, by moving the lever 53 to the position shown in Fig. 5. With the balancing machine adjusted in this manner, it is arranged to perform the balancing operation on one end of the rotor 5. The rotor is actuated by starting the motor 35, and the amount and position of unbalance in the end being tested may be determined by means of the balancing head 15, as described in my co-pending application, Serial No. 98,747, filed Mar. 31, 1926.

After the balancing operation has been completed, the bed member 6 may be again raised from the springs 8, and the lazytongs mechanism 71 be moved to shift the oscillation axis 10 into the balancing plane for which the correction has been obtained, and the bed member 6 be again lowered into engagement with the springs 8.

The rotor 5 may then be turned by hand until the scale 18 on the balancing head 15 indicates that the unbalanced mass in that end of the rotor is in the horizontal plane occupied by the axis of the rotor and also by the handle 75 and the pointer or center punch 76. The rotor may then be marked by means of the center punch 76 in order that correction for the unbalance may be placed in the proper position after the rotor has been removed from the balancing machine.

The balancing operation is then repeated in order to determine the amount and position of the unbalanced mass in the balancing plane first occupied by the axis of oscillation. After the second balancing operation has been performed, the bed 6 is again lifted from the springs 8 and the position of the unbalanced mass in the second balancing plane marked by means of the center punch 76, as before explained. The rotor 5 may then be lifted from the journals 12 and removed to a position suitable for applying correction weights or removing excess material in accordance with the positions and amounts determined by the balancing operation.

From the foregoing description and explanation, it will be readily appreciated that the invention provides a balancing machine which may be utilized to quickly and accurately determine the state of balance of a rotatable body.

Although I have described a specific embodiment of the invention, it will be obvious to those skilled in the art that various modifications may be made in the details of design and construction of the balancing machine embodying the principles set forth without departing from the spirit and scope of the invention, as defined in the appended claims.

I claim as my invention:

1. The combination, in a balancing machine, of a supporting base and a spring system comprising a plurality of leaf springs so mounted and interconnected on said base that their transverse axes lie in planes having a common line of intersection, said springs being adjustable to change the angle of intersection of the planes.

2. A spring system comprising a plurality of flexible beams that are disposed in such manner that the planes containing the neutral axes of the beams intersect in a line at all times, and means for adjusting said beams simultaneously to change the position of the line of intersection relative to the beams.

3. A balancing machine comprising a base, a plurality of leaf-spring members mounted vertically on the base, an oscillatable bed member mounted on the leaf-spring members and means for interconnecting said spring members in such manner that their planes intersect at all times at one center.

4. A balancing machine comprising a base, a plurality of leaf-spring members mounted vertically on the base, an oscillatable bed member mounted on the leaf-spring members, means for interconnecting said spring members in such manner that their planes intersect at all times at one center, and means for turning the interconnected springs about their axes to change the position of the line of intersection.

5. In a balancing machine, the combination with a supporting base, of a plurality of leaf springs mounted perpendicular to the base and disposed to lie in planes that intersect at a common axis at all times, means for adjusting the leaf springs simultaneously to change the position of the axis relative to the individual springs, and a vibrating bed mounted on the leaf springs.

6. A balancing machine comprising a base, a plurality of beam-spring members mounted on the base, an oscillatable bed member mounted on the beam-spring members, said beam-spring members being so mounted that they may be turned about their longitudinal axes, and means for so interconnecting the spring members that the planes occupied by their neutral axes intersect substantially in a line which is the axis of oscillation of the balancing machine.

7. In a balancing machine, in combination, a base, a plurality of leaf springs mounted vertically on the base in such manner that they lie in planes which intersect at a common vertical axis, a vibrating bed member mounted on the springs and means for adjusting the springs simultaneously to change the position of the vertical intersecting axis.

8. An oscillating system for a balancing machine comprising a base, a plurality of leaf springs mounted perpendicular to the base, means for adjusting said leaf springs whereby the springs are interconnected in such manner that they, at all times, lie in planes that radiate from an axis of oscillation, and may be turned to move the axis of oscillation without changing their position relative to the base, and a bed member carried by the leaf springs in such manner that it is disposed to oscillate about the axis of oscillation.

9. A balancing machine comprising a base, an oscillatable bed member mounted on the base and a movable fulcrum member interposed between the bed and the base, the fulcrum member comprising a plurality of leaf springs mounted on the base in such manner that they may be turned about their axes, and means for so interconnecting said leaf springs that the planes of their neutral axes intersect substantially in a common line which is the axis of oscillation of the bed member.

10. In a balancing machine, the combination with a supporting base, of a plurality of leaf springs mounted perpendicularly on said base, means for interconnecting the leaf springs in such manner that they lie in planes that intersect at a common axis, a vibrating bed mounted on the leaf springs and means for adjusting the interconnected leaf springs to move the common axis of intersection.

11. In a balancing machine, the combination with a supporting base, of a plurality of leaf springs mounted perpendicularly on said base, means for interconnecting the leaf springs in such manner that they lie in planes that intersect at a common axis, a vibrating bed mounted on the leaf springs, means for lifting the bed from the leaf springs and means for adjusting the angular positions of the interconnected leaf springs while the bed is in the lifted position.

12. In a machine for balancing rotatable bodies, a base having guide ways thereon, a spring system comprising leaf springs mounted vertically on the base in such manner that they are free to turn about vertical axes, a vibrating bed mounted on the leaf springs, a sliding grid mounted on the guide ways of the base and means for connecting the leaf springs to the sliding grid in such position that their planes at all times intersect at a common axis.

13. In a balancing machine comprising a supporting base and having an axis of oscillation extending vertically through the longitudinal center line thereof, a plurality of leaf springs mounted perpendicular to said base, said springs being so mounted that they may be turned about their axes and so interconnected that they lie at all times in planes that radiate from the axis of oscillation.

14. A balancing machine comprising a base, a plurality of leaf springs mounted vertically on the base, an oscillating bed member carried by the leaf springs, a sliding grid mounted on the base, means for connecting the sliding grid to the leaf springs in such manner that the planes occupied by them intersect at all times in a line which is the axis of oscillation of the oscillating bed member, said sliding grid member being disposed to turn the leaf springs to shift the axis of oscillation and means for moving the sliding grid member, said means comprising an indicator for showing the position of the axis of oscillation.

In testimony whereof, I have hereunto subscribed my name this 29th day of May, 1928.

WILLIAM E. TRUMPLER.